April 11, 1939.  H. FISCHER  2,153,618
INJECTION ENGINE
Filed April 22, 1937   3 Sheets-Sheet 1

Inventor:
Hans Fischer
By: Brown, Jackson, Boettcher & Dienner
Attys.

April 11, 1939.  H. FISCHER  2,153,618
INJECTION ENGINE
Filed April 22, 1937  3 Sheets-Sheet 2

Inventor:
Hans Fischer

April 11, 1939.  H. FISCHER  2,153,618
INJECTION ENGINE
Filed April 22, 1937   3 Sheets-Sheet 3
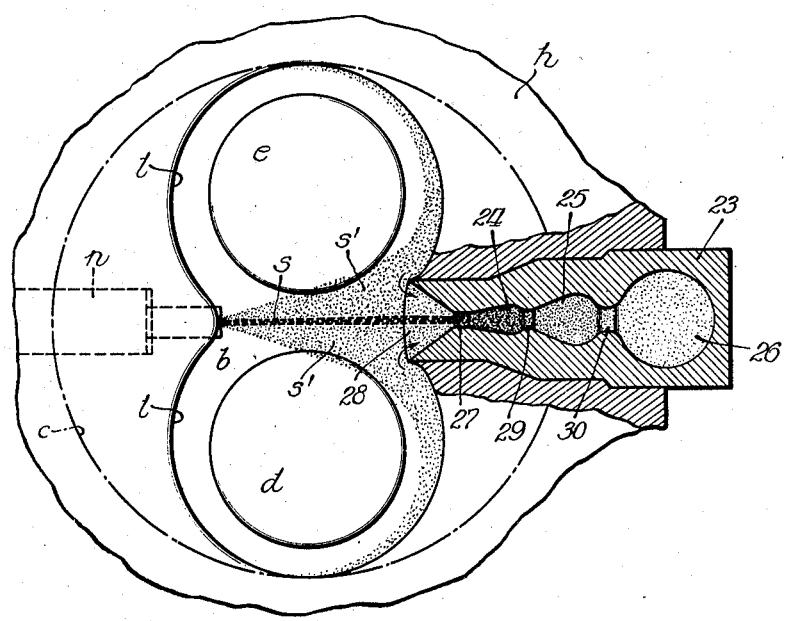
Inventor:
Hans Fischer Patented Apr. 11, 1939

2,153,618

UNITED STATES PATENT OFFICE 2,153,618

INJECTION ENGINE

Hans Fischer, Crestwood, N. Y., assignor to Lanova Corporation, New York, N. Y., a corporation of Delaware Application April 22, 1937, Serial No. 138,332

1 Claim. (Cl. 123—32)

This invention relates to injection engines, and has to do with injection engines of the air storage chamber solid injection type.

The invention is directed to improved combustion, with resulting increase in smoothness of operation and efficiency, in an engine of the character stated. A more specific object is to provide means for regulating the high velocity high pressure discharge of fluid from the storage chamber into the combustion chamber, so that mixing of air with fuel, in the combustion chamber, is progressively accelerated in a manner to complete combustion at the most efficient crank angle while avoiding objectionably high peak pressures therein. Further objects and advantages will appear from the detail description.

In the drawings:—

Figure 4 is a fragmentary underneath view of a cylinder head of an engine embodying my invention, partly broken away and in section, with the air storage chamber shown in section.

In a compression ignition engine of the air injection type the blast of the injection air can be controlled by mechanical means so that the rate of combustion is accelerated progressively and the mixing of fuel with air, in the combustion chamber, is under complete control. This renders it possible to realize a constant pressure cycle with its accompanying high thermal efficiency. As yet these ideal conditions have not been realized in solid injection engines.

In so-called air storage chamber compression ignition engines of known type, the mixing of fuel and air, in the combustion chamber, is effected by the blast of a high pressure high velocity fluid stream ejected into the combustion chamber from the storage chamber, incident to auxiliary combustion occuring in the latter chamber. To secure a low rate of combustion in the combustion chamber, at the beginning of the combustion period, and to accelerate the combustion progressively, the blast from the storage chamber must be properly timed. Considering the fact that the oxygen content of the combustion air diminishes as combustion progresses, it can be seen that the mixing process must be progressively accelerated in order to complete the combustion at the most efficient crank angle and at the same time control the rate of pressure rise in the combustion chamber within practical limits. This means that in order to approach the favorable combustion conditions of an air injection engine, in an air storage chamber injection engine, it is necessary to provide the latter with means properly to time the blast from the storage chamber. No adequate provision to that end is made in air storage chamber injection engines of known type.

Figure 2:
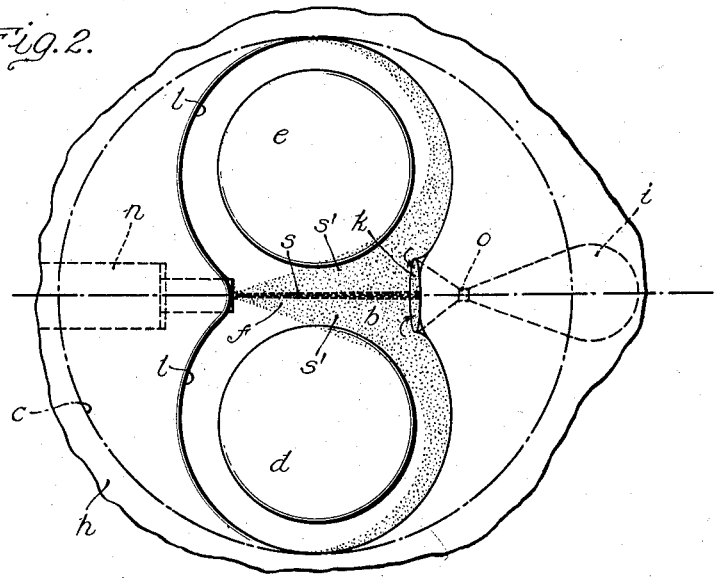
Figure 2 is an underneath view of the cylinder head of the engine of Figure 1.
Figure 1:
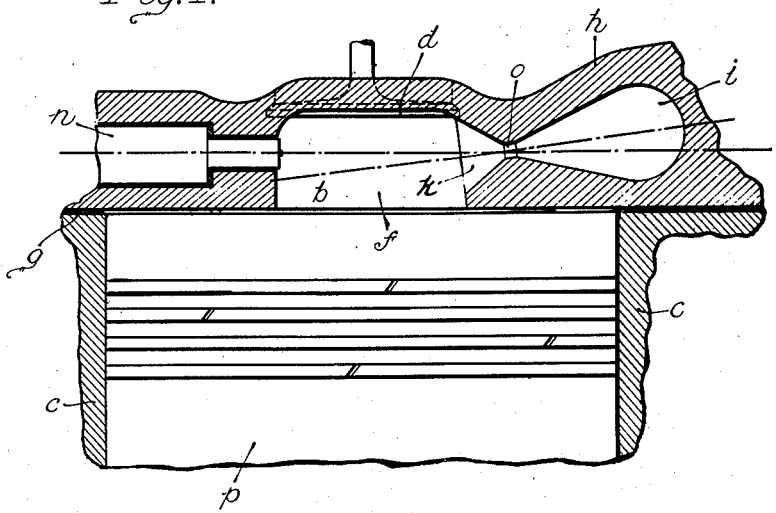
Figure 1 is an axial sectional view through the upper portion of the cylinder of an air storage chamber solid injection engine of known type, certain parts being shown in elevation, with the piston in upper dead center position.

It will be helpful to an understanding of my invention to consider first the nature of the combustion in an air storage chamber solid injection engine of known type, such as shown in Figures 1 and 2. This engine comprises a cylinder $c$, a piston $p$ operating in the cylinder, a removable head $h$ closing the upper end of the cylinder and mounted thereon in a known manner with an intervening gasket $g$, a combustion chamber $b$ formed in head $h$ and inlet and exhaust valves $d$ and $e$, respectively, controlling inlet and exhaust passages opening through the roof of the combustion chamber. The latter is of approximately figure 8 shape in plan, comprising a central constriction $f$ and substantially circular lobes $l$ at opposite sides of the constriction. The combustion chamber is inwardly offset relative to the cylinder wall, and overlies and opens downward into the cylinder area, as shown. An injection nozzle $n$ of known type is disposed at one side of constriction $f$ for injecting a solid stream of liquid fuel across the constriction of the combustion chamber substantially normal to the cylinder axis. An air storage chamber $i$ opens into combustion chamber $b$ at the opposite side of constriction $f$, through a restricted orifice $o$ and a funnel-shaped passage $k$ leading therefrom and flaring inward of the combustion chamber.

As the piston $p$ approaches its inner dead center position injection of fuel is initiated and continues until the piston has moved downward a predetermined distance, as is well understood in the art. The fuel is injected in a solid stream $s$ across the constriction of the combustion engine and into air storage chamber $i$, through passage $k$ and orifice $o$, a portion of the injected fuel stream being atomized to form a fine mist $s^1$ about the stream or core $s$ of the injected spray. This mist has little penetrating power relative to the core of the spray and, when the piston reaches its position of maximum compression, is first ignited by the heat of compression due to the favorable air-fuel ratio with respect to the fuel of the atomized portion of the spray, this fuel being in a finely subdivided condition or mist, as noted. Combustion is thus initiated in the combustion chamber $b$ and penetrates into the air storage chamber $i$, causing ignition and auxiliary combustion therein. This auxiliary combustion in the air storage chamber results in an immediate and great increase of pressure therein and, at the same time, the pressure rise in the main combustion chamber $b$ is relatively low due to lack of adequate air in the latter chamber to accelerate combustion in the area surrounding the core of the injected fuel spray. As a result of the high pressure in the air storage chamber and the relatively low pressure in the combustion chamber, a high velocity high pressure fluid stream is ejected from the former chamber into the combustion chamber, the blast thus created within the combustion chamber breaking up and atomizing the opposed fuel stream and directing the fuel particles and air into the lobes of the combustion chamber, with resultant intimate intermixing of the fuel and air and exceptionally rapid combustion of the fuel mixture thus produced. This is objectionable in that it causes dangerously high peak pressures in the combustion chamber, resulting in rough and inefficient operation of the engine.

Figure 3:
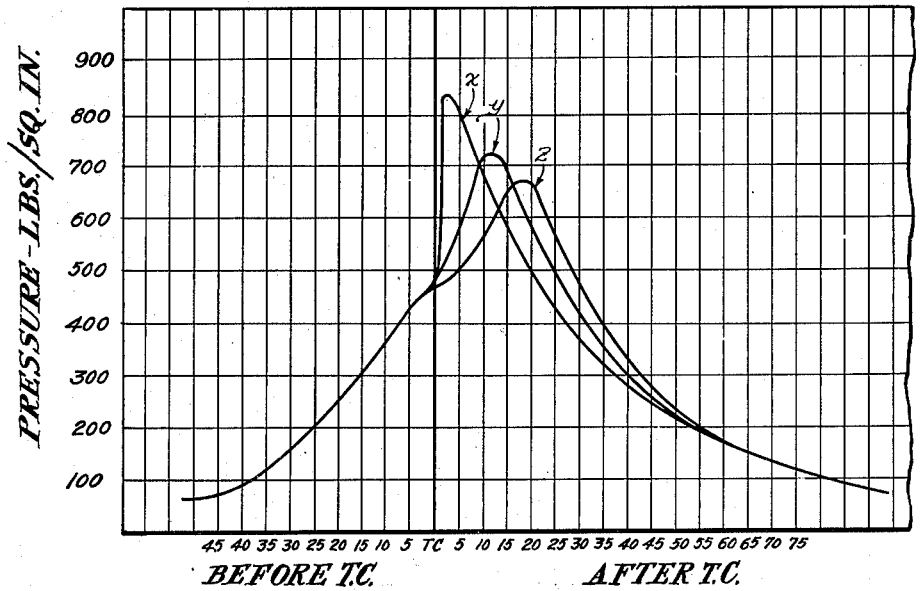
Figure 3 is a view of an indicator card showing three curves representing engines having different characteristics.

In Figure 3 the curves $x$, $y$ and $z$, though commonly termed combustion curves, are, more correctly, time-pressure curves. These curves respectively indicate the pressure obtaining in the combustion chamber in the normal operation of the engine, including the combustion period. The relatively heavy vertical line is the zero or reference line of the card, corresponding to the inner dead center position of the piston, the light vertical lines to the left indicate the crank angle before dead center, that is, different degrees in the angle of the crank shaft in advance of the piston reaching its inner dead center position, and the light vertical lines to the right indicate the crank angle after dead center. The pressure within the combustion chamber, at any selected crank angle, is indicated by the point of intersection of the vertical line corresponding to that crank angle with the curve representing the particular engine under consideration.

Referring to Figure 3, curve $x$ is the combustion curve of an engine such as that shown in Figures 1 and 2. It will be seen from this curve that the blast action of the air storage chamber follows almost instantly the initial combustion in the combustion chamber, causing an abrupt and excessively great increase of pressure within the latter chamber. This is objectionable, for the reasons stated.

Combustion curve $y$ of Figure 3 is an improvement over combustion curve $x$, in that the blast action of the air storage chamber is delayed, with the result that the maximum rate of combustion is also delayed, occurring at a greater crank angle after dead center than in curve $x$, and, since the piston is moving out with more effective resulting increase in the volume of the combustion space, the peak pressure is not as high as in curve $x$.

In curve $z$ the blast action of the air storage chamber is delayed relative to curve $y$, the maximum rate of combustion is also relatively delayed, occurring at a greater crank angle after dead center than in curve $y$, and, since the piston is moving out with even more effective resulting increase in the volume of the combustion space than in curve $y$, the peak pressure is lower than in the latter curve. Combustion curve $z$ is the most desirable, not only for its high efficiency but especially because it results in exceptionally smooth operation, and represents the combustion which I obtain by the engine of my invention.

In Figure 4 storage chamber 23, mounted in the cylinder head in a known manner, comprises three compartments 24, 25 and 26, preferably disposed in coaxial relationship. Inner compartment 24 opens into combustion chamber $b$ through a cylindrical passage 27 of uniform diameter defining, at its inner end, a circular orifice from which extends a funnel-shaped passage 28 flaring inward of the combustion chamber. Compartment 25 opens into the outer end of compartment 24 through a passage 29 of circular cross-section coaxial with passage 27 and defining, at its inner end, a circular orifice, it being noted that passage 29 is of appreciably greater cross-sectional area than passage 27. Compartment 26 opens into compartment 25, through a cylindrical passage 30 coaxial with, and of appreciably greater cross-sectional area than, passage 29. The combined volume of compartments 24 and 25 is materially less than that of compartment 26, being within from 10% to 30% of the total volume of the three compartments.

In the operation of the engine of Figure 4, the solid stream of injected fuel enters compartment 24, through passage 28 and passage 27, it being noted that the fuel of this stream is more or less broken up by the air entering compartment 24 through passage 27, during the compression stroke of the piston. This results in compartment 24 being filled with a rich fuel mixture, compartment 25 containing a more perfect and less rich fuel mixture, since passage 29 tends to restrict flow of fuel into compartment 25 from compartment 24, and compartment 26 being filled with a less rich and more perfect fuel mixture than compartment 25, due to the restrictive effect of passage 30. Upon ignition of the fuel mixture in the combustion chamber $b$, the fuel mixture in compartment 24 of chamber 23 is ignited by flame propagation, then the fuel mixture in compartment 25 is ignited, and thereafter the more perfect and less rich fuel mixture in compartment 26 is ignited. It will be noted that passages 27, 29 and 30 are of appreciable length and, being restricted, have considerable area relative to their cross sections. These passages have a quenching effect on the passing flame, thereby delaying the ignition in the adjacent compartments 24, 25 and 26. The rich mixture in compartment 24 will also retard the speed of the flame travel, as will the mixture in compartment 25, which is richer than that in compartment 26. The distances between the orifices 27, 29 and 30 also affect the time required for the flame to travel from 27 to 29 and thence to 30. Having provided the above mentioned resistances to the propagation of the flame to the compartments 25 and 26, the initial burning of the fuel in the combustion chamber $b$ has time to develop to a considerable extent until the flame ignites the mixture in compartment 25 and, thereafter, the more perfect mixture in compartment 26. By the resulting blow-off of compartment 25 and the succeeding blow-off of compartment 26, the blasts mix burning fuel into the fresh air, which results in a highly efficient burning of the fuel. Due to the preliminary stage of the combustion in the chamber $b$, the combustion will be completed in a shorter time than in the engine of Figures 1 and 2 and curve $x$ of Figure 3. The maximum combustion pressure within the combustion chamber is attained at about 18 degrees after dead center of the crank shaft, that is, about 18 degrees outward travel of the piston. Curve $z$ of Figure 3 represents the combustion produced by the use of the air storage chamber 10 in the engine of Figure 4.

The air storage chamber 23 of Figure 4 is particularly suited for use with low speed engines where the time for travel of the crank shaft through one degree increases and, therefore, a greater delay of the blast action is required in order to secure the peak pressure at approximately the same crank shaft degree as shown in curve $z$ of Figure 3.

I find that the relative volumes of the compartments of the air storage chamber, the cross area of the passage opening from the inner compartment of the air storage chamber into the combustion chamber, the distance between the passages of the air storage chamber compartments, and the ratio of the length to the diameter of such passages, all affect the operation of the engine. These factors may vary considerably, within limits, depending upon the speed and other characteristics of the engine. The effective cross-sectional area of the cylindrical passage opening from the inner compartment of the air storage chamber into the funnel-shaped passage should be from 1/400 to 1/750 of the area of the top face of the piston, and the effective cross-sectional area of the passage between the inner or first compartment of the air storage chamber and the second compartment thereof should be from 1/170 to 1/300 of the area of the top face of the piston. The length of these passages should be from ½ to two times the diameter thereof and the volume of the two smaller compartments, of the air storage chamber should be within from approximately 10% to 30% of the total volume of this chamber. The distance between the passage at the inner end of the first or inner compartment of the air storage chamber and the passage between this compartment and the second compartment, and the distance between the latter passage and the passage at the inner end of the third compartment should, in each instance, be equal to approximately ¼ to ¾ of the piston diameter.

In the form of my invention disclosed, the ratio of air to fuel increases as ejection of the fluid stream from the storage chamber into the combustion chamber progresses, since the mixture within the storage chamber becomes progressively leaner. This results in first retarding the combustion within the combustion chamber and then accelerating combustion therein, these effects being so timed that peak pressure occurs within the combustion chamber at the most favorable crank angle, as described. While I have illustrated my invention, by way of example, as embodied in an engine having a combustion chamber of approximately figure 8 shape in plan, this form of combustion chamber, while preferred, is not essential. In its broader aspects, my invention is applicable to injection engines having combustion chambers of various known suitable forms.

I claim:—

In an injection engine of the air storage chamber solid injection type, a cylinder and a piston operating therein, a combustion chamber opening into the cylinder area, an air storage chamber opening into said combustion chamber through a restricted orifice, and an injection nozzle disposed to inject a solid stream of fuel across said combustion chamber through said orifice into said storage chamber, the latter comprising three compartments, a first compartment opening into said combustion chamber through said orifice, a second compartment opening into said first compartment through an orifice of appreciably greater area than said first orifice, and a third compartment opening into said second compartment through an orifice of appreciably greater area than said second orifice.

HANS FISCHER.